US009827722B2

(12) United States Patent
Semler et al.

(10) Patent No.: US 9,827,722 B2
(45) Date of Patent: Nov. 28, 2017

(54) ELASTOMERIC ROLL FOR AN ELECTROPHOTOGRAPHIC IMAGE FORMING DEVICE HAVING COMPRESSIVE HOLLOW MICROPARTICLES DEFINING A SURFACE TEXTURE OF THE ROLL

(71) Applicant: LEXMARK INTERNATIONAL, INC., Lexington, KY (US)

(72) Inventors: James Joseph Semler, Versailles, KY (US); Kelly Ann Killeen, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 15/268,962

(22) Filed: Sep. 19, 2016

(65) Prior Publication Data

US 2017/0001386 A1  Jan. 5, 2017

Related U.S. Application Data

(62) Division of application No. 14/010,720, filed on Aug. 27, 2013, now abandoned.

(51) Int. Cl.
| | |
|---|---|
| *G03G 15/00* | (2006.01) |
| *B29C 70/66* | (2006.01) |
| *B29C 44/12* | (2006.01) |
| *B29D 99/00* | (2010.01) |
| *G03G 15/02* | (2006.01) |
| *G03G 15/08* | (2006.01) |
| *B29C 35/02* | (2006.01) |
| *B29K 21/00* | (2006.01) |

(Continued)

(52) U.S. Cl.
CPC .............. *B29C 70/66* (2013.01); *B29C 35/02* (2013.01); *B29C 44/1271* (2013.01); *B29C 44/1285* (2013.01); *B29D 99/0035* (2013.01); *G03G 15/0233* (2013.01); *G03G 15/0808* (2013.01); *G03G 15/0818* (2013.01); *B29K 2021/00* (2013.01); *B29K 2021/003* (2013.01); *B29K 2101/12* (2013.01); *B29K 2105/165* (2013.01); *B29K 2507/04* (2013.01); *B29L 2031/324* (2013.01); *Y10T 428/24372* (2015.01)

(58) Field of Classification Search
CPC ........... G03G 15/2057; G03G 15/0818; G03G 15/0808; G03G 15/0233; G03G 9/1136
See application file for complete search history.

(56) References Cited

U.S. PATENT DOCUMENTS

2015/0064399 A1* 3/2015 Semler .................. C09D 7/1291
428/141
2015/0065607 A1* 3/2015 Semler .................. B29C 67/207
523/218

* cited by examiner

*Primary Examiner* — Walter L Lindsay, Jr.
*Assistant Examiner* — Jessica L Eley
(74) *Attorney, Agent, or Firm* — Justin M. Tromp

(57) ABSTRACT

A method for forming a roll core for use in an electrophotographic image forming device according to one example embodiment includes shaping the roll core from a mixture of an uncured elastomer and hollow microparticles. The elastomer of the shaped roll core is cured without permanently expanding hollow microparticles positioned near the outer surface of the shaped roll core. After curing, the hollow microparticles positioned near the outer surface of the shaped roll core are permanently expanded to form the roll core having compressible and resiliently recoverable hollow microparticles extending beyond an outer circumference of the roll core and providing a surface texture to the roll core.

5 Claims, 6 Drawing Sheets

(51) Int. Cl.
*B29K 507/04* (2006.01)
*B29K 101/12* (2006.01)
*B29K 105/16* (2006.01)
*B29L 31/32* (2006.01)

ELASTOMERIC ROLL FOR AN ELECTROPHOTOGRAPHIC IMAGE FORMING DEVICE HAVING COMPRESSIVE HOLLOW MICROPARTICLES DEFINING A SURFACE TEXTURE OF THE ROLL

CROSS REFERENCES TO RELATED APPLICATIONS

This patent application is a divisional application of U.S. patent application Ser. No. 14/010,720, filed Aug. 27, 2013, entitled "Elastomeric Roll for an Electrophotographic Image Forming Device Having Compressible Hollow Microparticles Defining a Surface Texture of the Roll."

BACKGROUND

1. Field of the Disclosure

The present disclosure relates generally to rolls used in electrophotographic image forming devices and more particularly to a roll for an electrophotographic image forming device having compressible hollow microparticles defining a surface texture of the roll.

2. Description of the Related Art

During the image formation process of an electrophotographic image forming device, toner is transferred from a toner reservoir by various toner carrying members (including rolls) to a media sheet to form a toned image on the media sheet. For example, during a print or copy operation, a charging roll charges the surface of a photoconductive drum (PC drum) to a specified voltage. A laser beam is then directed to the surface of the PC drum and selectively discharges those areas it contacts to form a latent image. A developer roll, which forms a nip with the PC drum, may transfer toner to the PC drum to form a toner image on the PC drum. A toner adder roll may supply toner from the toner reservoir to the developer roll. A metering device such as a doctor blade may meter toner onto the developer roll and apply a desired charge on the toner prior to its transfer to the PC drum. The toner is attracted to the areas of the surface of the PC drum discharged by the laser beam. The toner image on the PC drum is transferred either directly by the PC drum or indirectly by one or more intermediate transfer members to the media sheet. The media sheet having the toner thereon passes through a fuser assembly that applies heat and pressure to fix the toner image to the media sheet.

Generally, a large portion of the energy consumed by an electrophotographic image forming device is in the power required to drive the motors and rotating components within the device. Reducing the torque required to drive the various rotating components reduces the overall energy consumption of the device. One way to reduce the required torque is to decrease the mass of the rotating components. Accordingly, rolls for use in an electrophotographic image forming device having decreased mass are desired. In addition, decreased mass also reduces the potential for product damage during general shipping conditions, e.g., dropping the product, vibration during shipping, etc.

Further, the force subjected to toner as it transfers between various rolls and components on its way from the toner reservoir to the media sheet may damage the toner at the particle level. For example, the particles may deform, fracture or lose extra particulate additives as a result of the forces applied by the components of the image forming device. This damage may lead to print defects such as toner filming. Toner damage may be reduced by decreasing the amount of force applied to the toner during its transfer. Accordingly, rolls for use in an electrophotographic image forming device that reduce toner working are desired.

A cost effective method for manufacturing rolls having decreased mass anchor that reduce toner working while maintaining tight control over the rolls' properties is also desired.

SUMMARY

A roll for use in an electrophotographic image forming device according to one example embodiment includes an elastomeric core having hollow microparticles dispersed within the core. The hollow microparticles are compressive and resiliently recoverable after receiving an applied force. Portions of at least some of the hollow microparticles extend beyond an outer circumference of the core and provide a surface texture to the core.

A method for forming a roll core for use in an electrophotographic image forming device according to one example embodiment includes shaping the roll core from a mixture of an uncured elastomer and hollow microparticles. The uncured elastomer of the shaped roll core is cured without permanently expanding hollow microparticles positioned near the outer surface of the shaped roll core. After curing, the hollow microparticles positioned near the outer surface of the shaped roll core are permanently expanded to form the roll core having compressible and resiliently recoverable hollow microparticles extending beyond an outer circumference of the roll core and providing a surface texture to the roll core.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
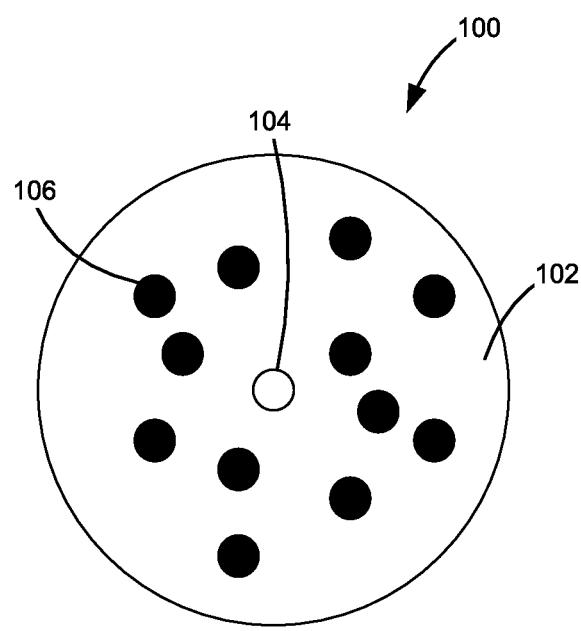
FIG. 1 is a cross sectional view of a roll having a core with hollow microparticles for use in an electrophotographic image forming device according to one example embodiment.

Referring now to the drawings, and more particularly to FIG. 1, a roll 100 for use in an electrophotographic image forming device, such as, for example a developer roll, is shown in cross section according to one example embodiment. In other embodiments, roll 100 may be another roll used in an electrophotographic image forming device such as, for example, a toner adder roll for supplying toner to a developer roll, a charge roll for charging the surface of a photoconductive drum, a backup or pressure roll for a fuser, etc. Roll 100 includes a roll core 102 mounted (e.g., molded) on a shaft 104. Shaft 104 may be electrically conductive or non-conductive. Conductive material may include metal such as aluminum, aluminum alloys, stainless steel, iron, nickel, copper, etc. Polymeric materials for shaft 104 may include polyamide, polyetherimide, etc.

Core 102 may be made of a thermoplastic or thermoset elastomeric type material. The elastomeric material may substantially recover (e.g., >75%) after an applied stress (e.g., a compression type force). The elastomeric material may be any suitable material that provides the ability for roll 100 to elastically deform at a given nip location in the image forming device while also providing some level of nip pressure. For example, core 102 may include an electrically conductive or semi-conductive soft rubber. The soft rubber may include, for example, silicone rubber, nitrile rubber, ethylene propylene copolymers, polybutadiene, styrene-co-butadiene, isoprene rubber, polyurethane, or a blend or copolymer of any of these rubbers. In one embodiment, core 102 is comprised of a polyurethane elastomer including an isocyanate portion and a polyol portion. The isocyanate portion may include, for example, toluene diisocyanate (TDI), polymeric TDI, diphenylmethane diisocyanate (MDI), polymeric MIDI, dicyclohexylmethane diisocyanate ($H_{12}$MDI), polymeric HOAK isophorone diisocyanate (IPDI), polymeric IPDI, 1,6-hexamethylene diisocyanate (HDI), polymeric HDI, etc. The polyol portion may include, for example, a polyether, polyester, polybutadiene, polydimethylsiloxane, etc. having two or more reactive hydroxyl groups or mixtures thereof. The conductivity of core 102 may be supplied by one or more ionic additives, inherently conductive polymers, carbon black, carbon nanoparticles, carbon fibers, graphite, etc. The ionic additives may include, for example, $LiPF_6$, $LiAsF_6$, $LiClO_4$, $LiBF_4$, $LiCF_3SO_3$, $LiN(SO_2CF_3)_2$, $LiC(SO_2CF_3)_3$, $LiPF_3(C_2F_5)$, $Cs(CF_3COCH_2COCF_3)$ (abbreviated as CsHFAc), $KPF_6$, $NaPF_6$, $CuCl_2$, $FeCl_3$, $FeCl_2$, $Bu_4NPF_6$, $Bu_4NSO_3CF_3$, $Bu_4NCl$, $Bu_4NBr$ or dimethylethyldodecylammonium ethosulfate. The inherently conductive polymer(s) may include, for example, polyaniline, poly(3-alkylthiophenes), poly(p-phenylenes), or poly(acetylenes).

Roll 100 also includes hollow microparticles 106 such as hollow microspheres dispersed within core 102. Hollow microparticles 106 are compressible under a pressure range of 0.1 to 10 bars and are resiliently recoverable to substantially their original size and shape. In one embodiment, the median size of hollow microparticles 106 is between about 1 µm and about 100 µm including all values and increments therebetween and may be as large as 500 µm. In one embodiment, the size range of hollow microparticles 106 (i.e., the difference between the tenth percentile (10%) particle size and the ninetieth percentile (90%) particle size) does not exceed one and a half times (1.5×) the median particle size. In one embodiment, two or more sets of hollow microparticles 106 are dispersed within core 102, each set differing by at least one property (e.g., size). Where roll 100 includes more than one set of hollow microparticle sizes, in one embodiment, the size range of each set of hollow microparticles 106 (i.e., the difference between the tenth percentile (10%) particle size and the ninetieth percentile (90%) particle size for that set) does not exceed one and a half times (1.5×) the median particle size of the set. Hollow microparticles 106 may include, for example, Expancel® Microspheres from AkzoNobel N.V., Amsterdam, the Netherlands or Dualite® Microspheres from Henkel Corporation, Dusseldorf, Germany. Hollow microparticles 106 may be pre-expanded or expanded during the formation of core 102 as discussed in greater detail below.

Roll 100 may include a coating (not shown) on the outer surface of core 102 as desired. For example, the coating may include an electrically conductive material in order to tune the electrical resistivity of the outer surface of roll 100 with respect to core 102. For example, the coating may include polyurethane and a conductive additive. The isocyanate portion and the polyol portion of the polyurethane may include any of the materials discussed above with respect to core 102. Additional curatives such as atmospheric moisture or polyamines may be used in conjunction with or as a replacement for the polyol portion of the polyurethane. In this embodiment, polyamines may include, for example, small molecule or polymer structures such as polyethers having two or more reactive amine groups. Further, the conductive additive may include any of the additives discussed above with respect to core 102. The coating may also include additional fillers such as, for example, silica to control rheological properties. The coating may be applied by any conventional means known in the art such as, for example, dip or spray coating.

Figure 2:
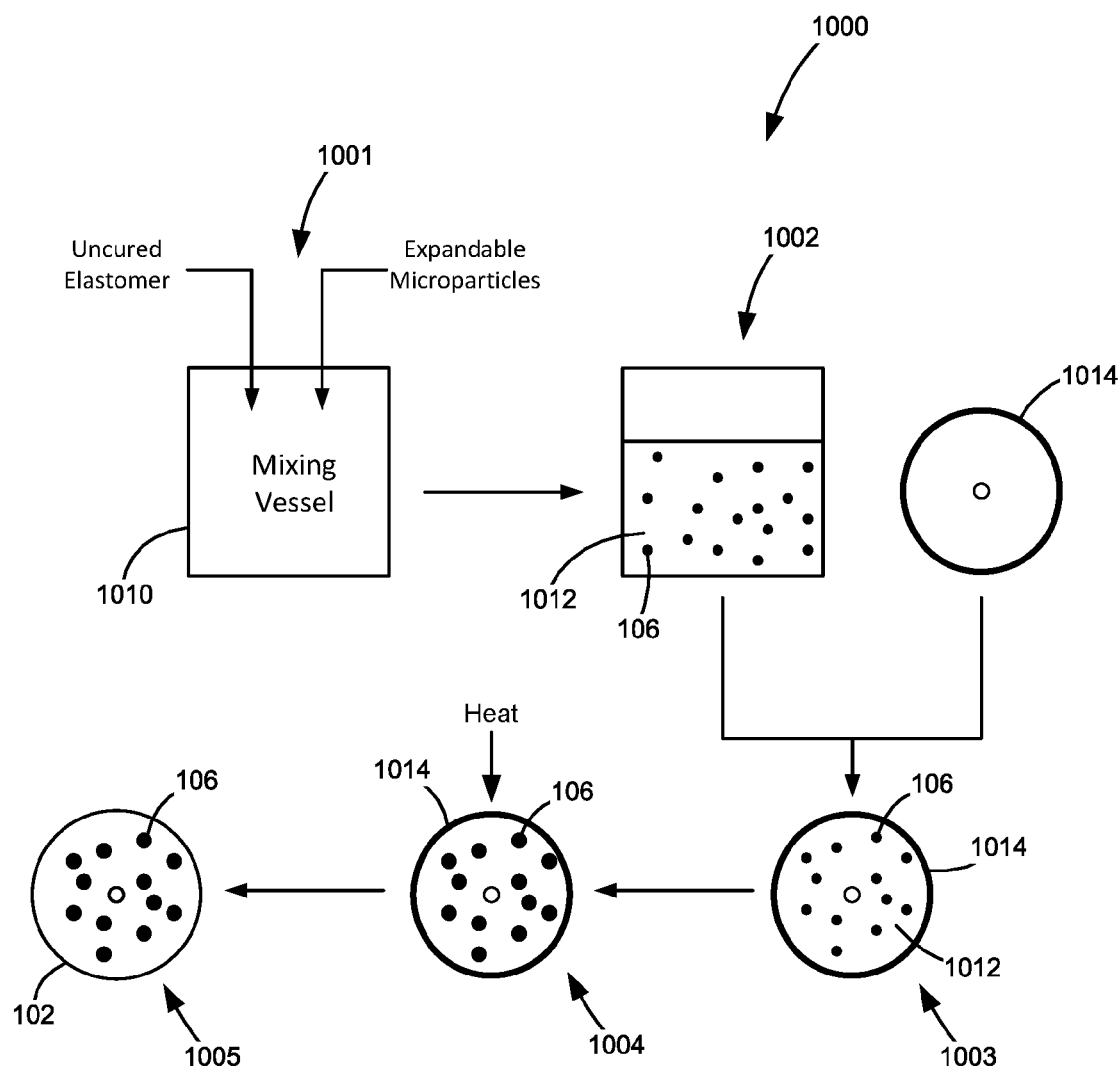
FIG. 2 is a schematic illustration of a process for making the roll shown in FIG. 1 according to one example embodiment.

FIG. 2 is a schematic illustration of a process 1000 for manufacturing roll 100 according to one example embodiment. At step 1001, the uncured elastomer of core 102 and hollow microparticles 106 in their unexpanded state are loaded into a mixing vessel 1010. At step 1002, the uncured elastomer and microparticles are mixed thoroughly to create a uniform dispersion 1012. At step 1003, the dispersed mixture 1012 is injected or otherwise loaded into a mold cavity 1014 in the shape of core 102. At step 1004, the mold cavity 1014 is heated in order to cure the elastomer and to permanently expand hollow microparticles 106. In this embodiment, hollow microparticles 106 include a polymer shell (e.g., a poly(methyl acrylate) (PMA) copolymer) encapsulating a gas (e.g., a hydrocarbon such as isobutane). When heated, the internal pressure from the gas increases and the shell stretches plastically thereby increasing the volume of microparticles 106. In one embodiment, hollow microparticles 106 are permanently expanded upon heating to a temperature between 80° C. and 175° C. At step 1005, the molded component is cooled and removed from mold cavity 1014 resulting in core 102. After the hollow microparticles 106 are cooled, the shell retains its increased size without permitting the gas to leak from or deflate the shell. Care must be taken not to overheat the microparticles during step 1004 so as not to damage the shell which may cause the gas to leak from the shell causing the microparticle to deflate and shrink. After core 102 is removed from mold cavity 1014, core 102 may then be moved to any desired finishing operations such as, for example, a coating operation. In one alternative, hollow microparticles 106 are preexpanded to their final size prior to mixing with the uncured elastomer such that the heating performed at step 1004 cures the elastomer but does not substantially alter the size of hollow microparticles 106. In another alternative, at step 1004, mold cavity 1014 is heated to a temperature sufficient to cure the elastomer but less than a minimum temperature at which hollow microparticles 106 permanently expand. The molded component may then be heated above the minimum temperature at which hollow microparticles 106 permanently expand either before or after the molded component is removed from mold cavity 1014 in order to permanently expand hollow microparticles 106.

Example 1

Samples were prepared with hollow microspheres having the trade name Expancel® Microspheres from AkzoNobel N.V. (model number 461DU40) dispersed in silicone rubber. The silicone rubber was cured prior to permanently expanding the hollow microspheres. The samples were heated to permanently expand the hollow microspheres and tested to determine the percentage increase in sample thickness resulting from the expansion of the hollow microspheres as summarized in Table 1 below.

TABLE 1

| Weight Percentage of hollow microspheres in silicone rubber | % Increase in sample thickness |
| --- | --- |
| 9.1% (9-15 μm microparticles) | 3.80% |
| 20.1% (9-15 μm microparticles) | 11.5% |

As seen in Table 1, additional expansion of the samples was achieved upon expanding the hollow microparticles even after the silicone rubber had already been cured. It is believed that if the silicone rubber was not cured prior to heating, the observed sample expansion would be much greater.

Roll 100 having core 102 with hollow microparticles 106 dispersed therein has a lower mass in comparison with a roll having a solid core without hollow microparticles 106 given the same geometric dimensions. Foam cores are also known to reduce the mass of a roll in comparison with a roll having a solid core. However, the creation of cells using hollow microparticles 106 presents advantages over known foam creating techniques. For example, current foam processes generally utilize a chemical process or an aeration process to form an elastomeric foam having a cell structure. The chemical process relies on a chemical reaction that produces a gas as a byproduct during the formation of the elastomer. The gas creates the cells in the foam. The aeration process introduces air during the mixing process in order to create cells in the foam. Both of these processes require tight process control in order to keep the cell sizes within a desired distribution. In contrast, the density of the cells in roll 100 can be controlled more easily simply by adjusting the percentage of hollow microparticles 106 in core 102. Further, the cell sizes can be readily controlled by the selection of the hollow microparticles 106 based on the unexpanded or expanded particle size. The cell sizes may also be controlled by the temperature during particle expansion and the duration of heating. The distribution of the cell sizes is dictated by the particle size distribution of the hollow microparticles 106 which can be tightly controlled. Further, because microparticles 106 deflect under pressure and their original shape is recoverable, the hardness of core 102 may be tuned as desired. Accordingly, the inclusion of hollow microparticles 106 in core 102 permits improved process control of the mass and hardness of core 102. Specifically, the mass and mechanical properties of core 102 may be controlled by adjusting the pore density of core 102 and the mechanical properties of core 102 may be further controlled by controlling the cell sizes.

Figure 3:
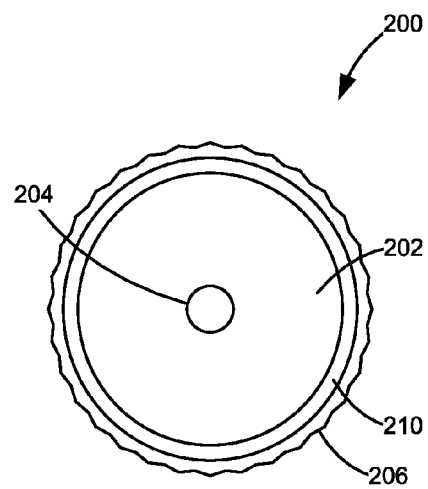
FIG. 3 is a cross sectional view of a roll for an electrophotographic image forming device having a coating according to one example embodiment.

With reference to FIG. 3, a roll 200 for use in an electrophotographic image forming device, such as, for example a developer roll, is shown in cross section according to one example embodiment. Roll 200 includes an elastomeric core 202 mounted on a shaft 204. Shaft 204 may be electrically conductive or non-conductive and may be composed of the materials discussed above with respect to shaft 104 of roll 100. Like core 102 discussed above, core 202 may be made of a thermoplastic or thermoset elastomeric type material that substantially recovers after an applied stress. Core 202 may be composed of the materials discussed above with respect to core 102 of roll 100 and may include the conductive additives discussed above. In one embodiment, core 202 includes hollow microparticles such as hollow microparticles 106 discussed above. Alternatively, core 202 may be solid in construction or core 202 may be a foam material having a closed cell structure.

Figure 4:
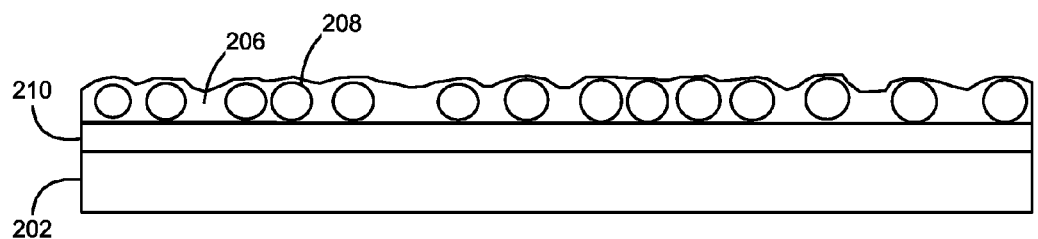
FIG. 4 is an enlarged view of the roll shown in FIG. 4 showing hollow microparticles dispersed in a coating of the roll according to one example embodiment.

Roll 200 includes a coating 206 on the outer surface of core 202. As discussed above, the coating may include an electrically conductive material in order to tune the electrical resistivity of the outer surface of roll 200 with respect to core 202. The coating may be composed of the materials discussed above with respect to the optional coating of roll 100 and may include the curatives, fillers and conductive additives discussed above. With reference to FIG. 4, coating 206 includes hollow microparticles 208 dispersed therein. Hollow microparticles 208 may have the properties and may be composed of the materials of hollow microparticles 106 discussed above with respect to roll 100. In one embodiment, hollow microparticles 208 are permanently expanded prior to curing coating 206, which may be cured by any suitable method such as, for example, heating, UV or IR curing, etc. In another embodiment, hollow microparticles 208 are dispersed in coating 206 in their pre-expanded state and expanded to their final size after coating 206 has been cured. In another embodiment, hollow microparticles 208 are dispersed in coating 206 in their pre-expanded state and coating 206 and hollow microparticles 208 are then heated in order to cure coating 206 and to permanently expand hollow microparticles 208. In one embodiment, two or more sets of hollow microparticles 208 are dispersed within coating 206, each set differing by at least one property (e.g., size). Where coating 206 includes more than one set of hollow microparticle sizes, in one embodiment, the size range of each set of hollow microparticles 208 (i.e., the difference between the tenth percentile (10%) particle size and the ninetieth percentile (90%) particle size for that set) does not exceed one and a half times (1.5×) the median particle size of the set.

With reference to FIGS. 3 and 4, in one embodiment, roll 200 includes a coating support layer 210 positioned between coating 206 and the outer surface of core 202. Coating support layer 210 may be a primer layer that increases the adhesion between coating 206 and the outer surface of core 202. Coating support layer 210 may alternatively be a layer of the same material as coating 206 except without hollow microparticles 208 in order to achieve a desired total coating thickness (coating support layer 210 coating 206). In another embodiment, no coating support layer 210 is present and coating 206 having hollow microparticles 208 is applied directly to the outer surface of core 202. In another embodiment, a layer of the coating material without hollow microparticles 208 may be positioned on top of the coating layer 206 having hollow microparticles 208 such that the hollow microparticles 208 of coating layer 206 translate through the coating layer without hollow microparticles 208 to define the surface topography of roll 200. In one embodiment, the total coating thickness is between about 1 and 100 µm including all values and increments therebetween. In one embodiment, the thickness of the coating layer without hollow microparticles 208 positioned on top of coating layer 206 is between about 1 and 100 µm including all values and increments therebetween.

The surface topography and roughness of roll 200 may be tailored to a desired value based on the thickness of coating 206 and the concentration and size of hollow microparticles 208 included in coating 206. In general, a larger coating thickness will tend to have a lower surface roughness value. Where roll 200 is a developer roll, the surface topography may be tailored to achieve a desired toner mass flow. In general, a rougher surface will tend to carry more toner (by mass) per area of the surface of roll 200. In one embodiment, the surface roughness (Ra) of roll 200 is between 0.1 and 5.0 µm including all values and increments therebetween. In one embodiment, the surface roughness (Rz) of roll 200 is between 0.1 and 25 um including all values and increments therebetween.

Example 2

Samples were prepared with hollow microspheres having the trade name Expancel® Microspheres from AkzoNobel. N.V. (model number 461DU40) dispersed in a silicone coating. The mixture was 20% by weight of the microspheres. The coating samples were cured prior to permanently expanding the hollow microspheres. The samples were then heated to permanently expand the hollow microspheres. The samples were tested to determine the surface roughness before and after expansion of the microspheres according to various methods as summarized in Table 2 below.

TABLE 2

| Exposure Type | Before Heating | | | After Heating | | |
|---|---|---|---|---|---|---|
| | Ra (µm) | Rz (µm) | Rpc (cm$^{-1}$) | Ra (µm) | Rz (µm) | Rpc (cm$^{-1}$) |
| UV Surface Heating (5 second exposure) | 0.091 | 0.949 | 3.750 | 2.091 | 17.497 | 242.500 |
| Bulk Heating via Oven (125° C. for 1 hour) | 0.096 | 0.948 | 4.167 | 0.458 | 4.610 | 217.292 |

It is believed that the UV treatment resulted in a higher temperature than the 125° C. oven and therefore caused greater microsphere expansion. Accordingly, it can be observed from Table 2 that the surface roughness of a coating can be tailored by the inclusion of hollow microparticles.

Figure 5A:
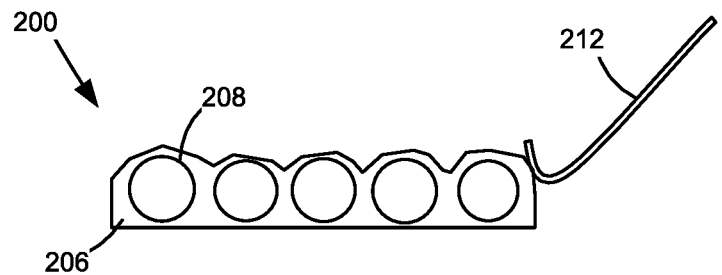
FIGS. 5A-C show sequential views of the response of the coating shown in FIG. 4 to a force applied to the roll by a doctor blade.
Figure 5B:
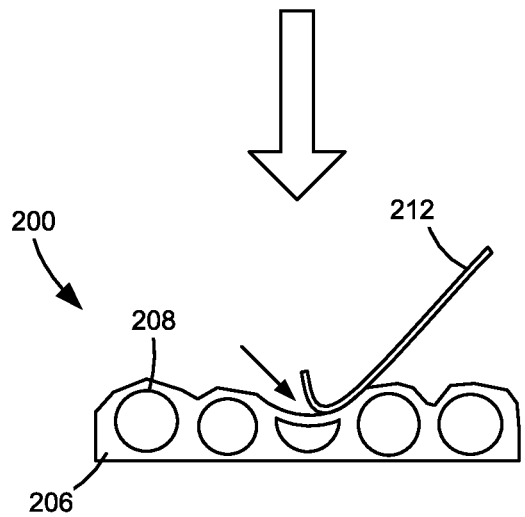
Figure 5C:
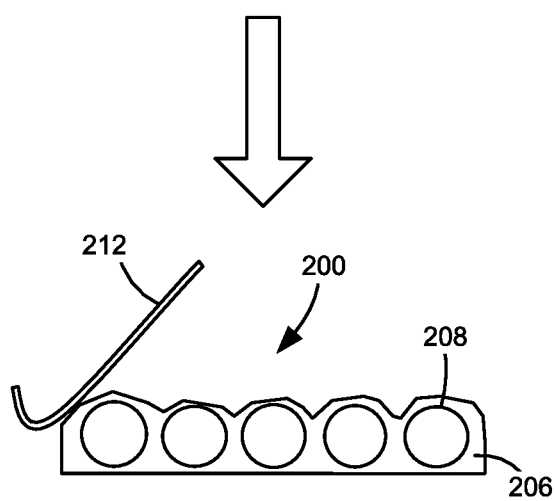

As discussed above, hollow microparticles 208 are compressible under pressure and resiliently recoverable to substantially their original shape after deformation. FIGS. 5A-C show an example of this dynamic response. In FIG. 5A, a doctor blade 212 is shown engaged with the outer surface of roll 200 along coating 206. As roll 200 rotates (to the right or clockwise as viewed in FIGS. 5A-C), the generally stationary doctor blade 212 passes along the outer circumference of roll 200 and applies a force to the outer surface of roll 200 across the axial length of roll 200 in order to regulate the amount of toner carried by roll 200. As roll 200 rotates further, as shown in FIG. 5B, the force of doctor blade 212 causes hollow microparticles 208 to deflect as doctor blade 212 passes. As roll 200 rotates further, as shown in FIG. 5C, the hollow microparticles 208 deflected by doctor blade 212 recover to substantially their original size and shape. In this manner, hollow microparticles 208 act as shock absorbers for the toner on roll 200 since hollow microparticles 208 are more compliant than toner particles thereby reducing the mechanical working applied to the toner and ultimately the damage incurred by the toner during the electrophotographic development process.

In the example embodiment illustrated, coating 206 is unground. However, a grinding operation may be applied to coating 206 in order to release some of the hollow microparticles 208 from coating 206 to form voids in coating 206 to further tune the surface roughness of coating 206.

Figure 6:
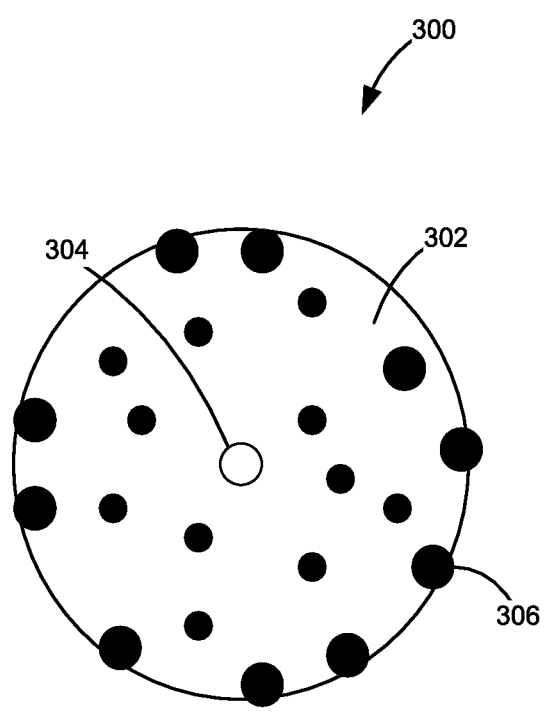
FIG. 6 is a cross sectional view of a roll having hollow microparticles providing a surface topography of the roll for use in an electrophotographic image forming device according to one example embodiment.

With reference to FIG. 6, a roll 300 for use in an electrophotographic image forming device, such as, for example a developer roll, is shown in cross section according to one example embodiment. Roll 300 includes an elastomeric core 302 mounted on a shaft 304. Shaft 304 may be electrically conductive or non-conductive and may be composed of the materials discussed above with respect to shafts 104 and 204. Like cores 102 and 202 discussed above, core 302 may be made of a thermoplastic or thermoset elastomeric type material that substantially recovers after an applied stress. Core 302 may be composed of the materials discussed above with respect to cores 102 and 202 and may include the conductive additives discussed above. Roll 300 includes hollow microparticles 306 dispersed within core 302. Hollow microparticles 306 may have the properties and may be composed of the materials of hollow microparticles 106 and 208 discussed above. Portions of some of the hollow microparticles 306 of roll 300 extend beyond the outer circumference of core 302 and thereby provide a surface texture to core 302. In contrast, hollow microparticles 106 of roll 100 are substantially contained within the outer circumference of core 102. In one embodiment, roll 300 does not include a coating on core 302. Instead, hollow microparticles 306 provide the surface topography directly. In another embodiment, a coating layer that does not include hollow microparticles is included on the outer surface of core 302 such that hollow microparticles 306 in core 302 translate through the coating to define the surface topography of roll 300. The coating may be composed of the materials discussed above with respect to the optional coating of roll 100 and may include the curatives, fillers and conductive additives discussed above.

Figure 7:
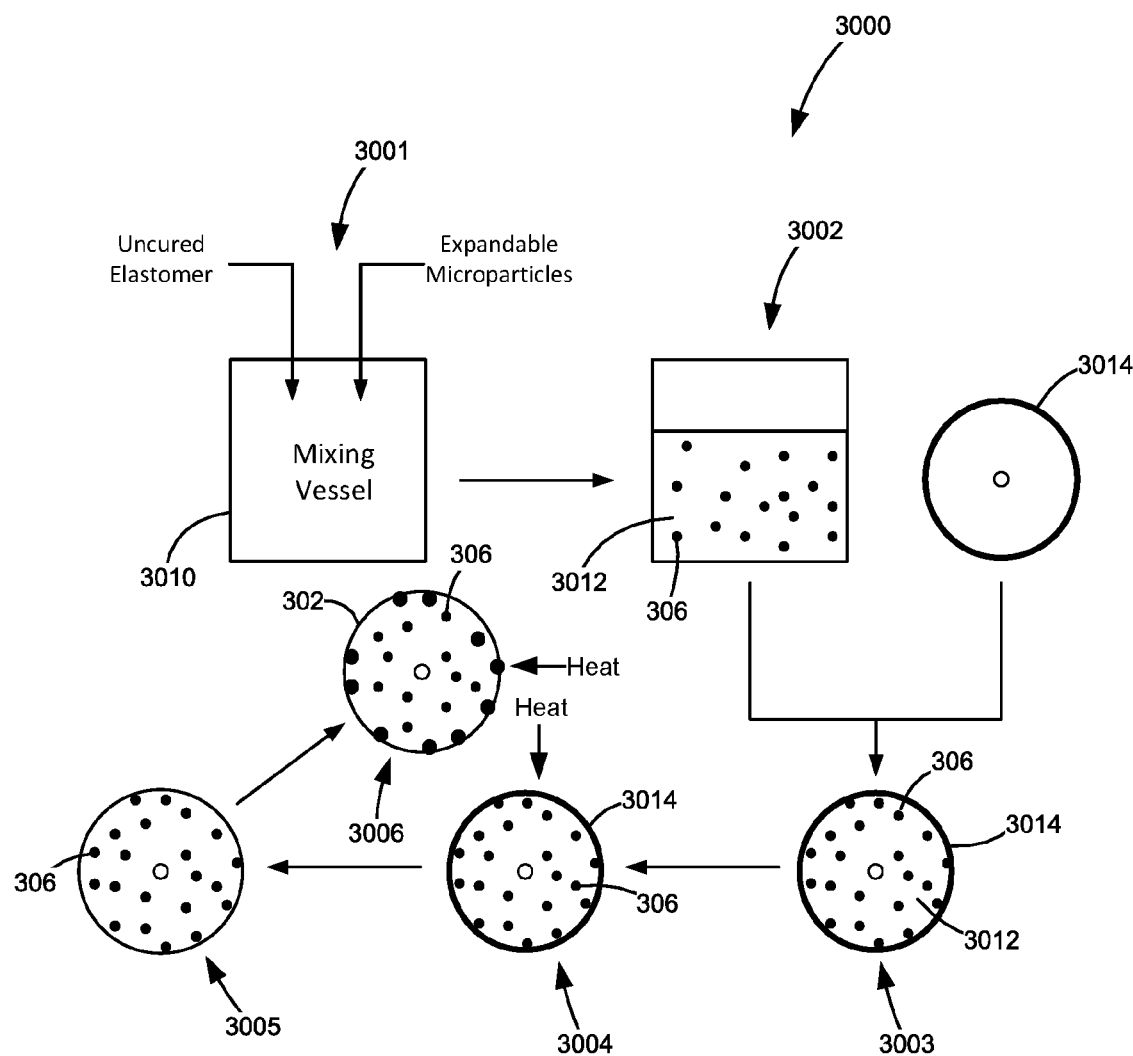
FIG. 7 is a schematic illustration of a process for making the roll shown in FIG. 6 according to one example embodiment.

FIG. 7 is a schematic illustration of a process 3000 for manufacturing roll 300 according to one example embodiment. At step 3001, the uncured elastomer of core 302 and hollow microparticles 306 in their unexpanded state are loaded into a mixing vessel 3010. At step 3002, the uncured elastomer and microparticles are mixed thoroughly to create a uniform dispersion 3012. At step 3003, the dispersed mixture 3012 is injected or otherwise loaded into a mold cavity 3014 in the shape of core 302. At step 3004, mold cavity 3014 is heated to a temperature sufficient to cure the elastomer but less than a minimum temperature at which hollow microparticles 306 permanently expand. At step 3005, the molded component having cured elastomers is cooled and removed from mold cavity 3014. At step 3006, an external heat source such as, for example a UV or IR heat source, forced heated air, conduction by rolling on a hot plate, electromagnetic heating, etc., is used to heat the outer surface of the molded component above the minimum temperature at which hollow microparticles 306 permanently expand in order to permanently expand hollow microparticles 306. Once the desired level of expansion is achieved, the component is cooled resulting in core 302 having hollow microparticles 306 extending beyond the outer circumference of the elastomeric portion of core 302 and providing a surface texture to core 302. Core 302 may then be moved to any desired finishing operations such as, for example, a coating operation. Alternatively, a coating may be applied prior to expanding hollow microparticles 306 and the outer surface of roll 300 may be heated to cure the coating and to permanently expand hollow microparticles 306.

The surface topography and roughness of roll 300 may be tailored to a desired value based on the concentration and size of hollow microparticles 306 included in core 302 and the heating temperature and duration. Where roll 300 is a developer roll, the surface topography may be tailored to achieve a desired toner mass flow. In one embodiment, the surface roughness (Ra) of roll 300 is between 0.1 and 5.0 μm including all values and increments therebetween. In one embodiment, the surface roughness (Rz) of roll 300 is between 0.1 and 25 μm including all values and increments therebetween. Hollow microparticles 306 act as shock absorbers for the toner on roll 300 thereby reducing the mechanical working applied to the toner and ultimately the damage incurred by the toner during the electrophotographic development process. Further, process 3000 provides a relatively simple process for manufacturing a roll having a tuned topography. Further, roll 300 may be more robust and less prone to wear issues than a comparable roll that uses beads or other particles in a coating layer to provide a desired surface topography. In addition, roll 300, like roll 100, has a lower mass in comparison with a roll having a solid core without hollow microparticles 106.

In the example embodiment illustrated, core 302 is unground. However, a grinding operation may be applied to core 302 in order to release some of the hollow microparticles 306 to form voids in the outer surface of core 302 to further tune the surface roughness of core 302.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A method for forming a roll core for use in an electrophotographic image forming device, comprising:
   shaping the roll core from a mixture of an uncured elastomer and hollow microparticles;
   curing the elastomer of the shaped roll core without permanently expanding hollow microparticles positioned near the outer surface of the shaped roll core; and
   after curing, permanently expanding the hollow microparticles positioned near the outer surface of the shaped roll core to form the roll core having compressible and resiliently recoverable hollow microparticles extending beyond an outer circumference of the roll core and providing a surface texture to the roll core.

2. The method of claim 1, wherein shaping the roll core from the mixture of the uncured elastomer and hollow microparticles includes loading the mixture of the uncured elastomer and hollow microparticles into a mold cavity.

3. The method of claim 2, wherein curing the elastomer of the shaped roll core without permanently expanding the hollow microparticles positioned near the outer surface of the shaped roll core includes heating the mixture of the uncured elastomer and hollow microparticles in the mold cavity to at least a temperature sufficient to cure the elastomer but not sufficient to permanently expand the hollow microparticles positioned near the outer surface of the shaped roll core.

4. The method of claim 3, wherein permanently expanding the hollow microparticles positioned near the outer surface of the shaped roll core includes removing the shaped roll core from the mold cavity and then heating the outer surface of the shaped roll core to at least a temperature sufficient to permanently expand the hollow microparticles.

5. The method of claim 4, wherein heating the outer surface of the shaped roll core to at least a temperature sufficient to permanently expand the hollow microparticles includes heating the outer surface of the shaped roll core to between 80° C. and 175° C.

* * * * *